(12) United States Patent
Ulcej

(10) Patent No.: US 6,663,375 B1
(45) Date of Patent: Dec. 16, 2003

(54) DUAL FLEXIBLE LIP EXTRUSION APPARATUS WITH PIVOTING ACTUATION MEMBER

(75) Inventor: John A. Ulcej, Colfax, WI (US)

(73) Assignee: Extrusion Dies, Inc., Chippewa Falls, WI (US)

( * ) Notice: Subject to any disclaimer, the term of this patent is extended or adjusted under 35 U.S.C. 154(b) by 575 days.

(21) Appl. No.: 09/596,639

(22) Filed: Jun. 19, 2000

(51) Int. Cl.$^7$ ............................................. B29C 47/16
(52) U.S. Cl. .................. 425/141; 425/192 R; 425/381; 425/466
(58) Field of Search ................. 425/141, 190, 425/192 R, 381, 465, 466

(56) References Cited

U.S. PATENT DOCUMENTS

| | | | |
|---|---|---|---|
| 1,422,356 A | * 7/1922 | Heller | |
| 2,938,231 A | * 5/1960 | Lowey, Jr. | |
| 3,096,543 A | * 7/1963 | Konopacke et al. | 425/466 |
| 3,264,686 A | * 8/1966 | Soloduk | |
| 3,377,655 A | * 4/1968 | Kucharski et al. | 425/466 |
| 3,830,610 A | * 8/1974 | Ohkawa et al. | 425/141 |
| 3,859,032 A | * 1/1975 | Krupa | 425/466 |
| 3,940,221 A | * 2/1976 | Nissel | 425/141 |
| 4,055,389 A | * 10/1977 | Hayward | 425/466 |
| 4,302,172 A | * 11/1981 | Hogseth et al. | 425/141 |
| 4,454,084 A | * 6/1984 | Smith et al. | 264/40.1 |
| 4,517,145 A | * 5/1985 | Knopf | 264/40.2 |
| 4,522,678 A | * 6/1985 | Zieke | |
| 4,592,710 A | * 6/1986 | Reifenhauser et al. | 425/141 |
| 4,594,063 A | * 6/1986 | Reifenhauser et al. | 425/141 |
| 4,753,587 A | * 6/1988 | Djordjevic et al. | 425/141 |
| 4,854,844 A | * 8/1989 | Carlsen | 425/141 |
| 4,978,289 A | * 12/1990 | Maejima | 425/141 |
| 4,990,078 A | * 2/1991 | Tomita | 425/141 |
| 4,990,079 A | * 2/1991 | Lorenz | 425/141 |
| 5,020,984 A | * 6/1991 | Cloeren et al. | 425/141 |
| 5,046,938 A | * 9/1991 | Hirschberger | 425/141 |
| 5,066,435 A | * 11/1991 | Lorenz et al. | 264/40.5 |
| 5,067,432 A | * 11/1991 | Lippert | |
| 5,102,602 A | * 4/1992 | Ziegler | 425/141 |
| 5,208,047 A | 5/1993 | Cloeren et al. | 425/141 |
| 5,253,992 A | 10/1993 | Reifenhauser | 425/141 |
| 5,284,430 A | 2/1994 | Tomic et al. | 425/133.5 |
| 5,464,577 A | 11/1995 | Leonard et al. | 264/40.5 |
| 5,511,962 A | 4/1996 | Lippert | 425/141 |
| 5,622,730 A | 4/1997 | Nitta et al. | 425/141 |
| 5,626,888 A | 5/1997 | Sanze et al. | 425/141 |
| 5,679,383 A | 10/1997 | Ryan et al. | 425/141 |
| 5,962,041 A | 10/1999 | Ryan et al. | 425/141 |
| 6,017,207 A | 1/2000 | Druschel | 425/141 |
| 6,019,924 A | 2/2000 | Montalbano | 264/176.1 |
| 6,287,105 B1 | * 9/2001 | Druschel et al. | 425/466 |

FOREIGN PATENT DOCUMENTS

| | | |
|---|---|---|
| DE | 9422051 | 9/1997 |
| EP | 0 456 176 | 11/1991 |
| EP | 0 805 014 | * 1/1997 |
| EP | 0 668 143 | 10/1998 |
| GB | 2 028 228 | 3/1980 |

OTHER PUBLICATIONS

Drawing of Prior Art Die.
Drawing of Prior Art Die.
Drawing of Prior Art Die.
European Search Report date May 19, 1995, Appl. No. 94112554.4.
Extrusion Dies, Inc. Sales Literature (Sliding Wedge), 1992.
Extrusion Dies, Inc. Drawing & Written Description, "EDI Sliding Wedge", "EDI Push–Pull", 1989.
European Examination Report dated Jun. 1997, Appl. No. 94112554.4.

* cited by examiner

Primary Examiner—James P. Mackey
Assistant Examiner—Joseph Leyson
(74) Attorney, Agent, or Firm—McCracken & Frank

(57) ABSTRACT

An extrusion apparatus includes first and second die body portions each having a main body and a lip interconnected with the main body wherein the die body portions are joined such that a die outlet is formed between the lips. The apparatus also includes at least one pivoting link coupled to one of the lips and a sliding member coupled to the pivoting link whereby movement of the sliding member causes the pivoting link to pivot and move the one lip relative to the other lip.

34 Claims, 15 Drawing Sheets

DUAL FLEXIBLE LIP EXTRUSION APPARATUS WITH PIVOTING ACTUATION MEMBER

TECHNICAL FIELD

The present invention relates generally to extrusion apparatus and, more particularly, to an apparatus for extruding a stream of thermoplastic material through an outlet defined by a pair of flexible lips.

BACKGROUND ART

Dies for extruding thermoplastic material typically include a pair of die portions joined together to define an outlet through which molten thermoplastic material is extruded. Specifically, each die portion includes a lip, and the lips of the two die portions cooperate to define a die outlet or lip gap.

In one type of prior art extrusion apparatus, the lips are integral with the die portions and a first one of the lips is joined to a respective die portion by a flexible hinge. Apparatus is provided to adjust the position of the first lip and thus the width of the lip gap. Specifically, the adjustment apparatus includes a plurality of thermally responsive members spaced along the width of the die and a plurality of heater elements each disposed in heat-transfer relationship with a thermally responsive member. The heater elements are individually controlled to adjust the profile of the lip gap at one edge thereof. Alternatively, a manually operable adjustment apparatus may be provided to adjust the width of the lip gap. In either case, the adjustability of the die is limited by the deflection limit of the flexible hinge. Also, the initial set-up procedure to preset the desired outlet width can be undesirably time consuming.

In another prior art extrusion die, referred to as a "sliding lip" die, first and second die lip members are separate from and carried by respective die portions. The first die lip member is rigidly secured to the die body while a second die lip member is mounted for sliding movement relative to the first die lip member. Again, adjustment apparatus is provided for positioning the second die lip member so that a desired lip gap width is achieved and maintained. While this die design has a wide adjustment range, changing of the gap width can be a lengthy process and gauge control capability is limited.

A third prior art extrusion die includes first and second die body portions, one having a first lip coupled integrally therewith by a flexible hinge and the other having a second, removable lip bolted thereto. A plurality of thermally responsive members is coupled to the first lip for adjusting the position of that lip to achieve a desired extrudate profile. The removable lip, on the other hand, is stationary but can be replaced by other lip members having different dimensions so that the base lip gap can be selected as desired or necessary. This die has relatively good gauge control compared with other prior art die designs but requires a longer time to change the base lip gap and thus has a longer product changeover time.

Because processors of extruded film, sheet, and coatings often must meet their customers' demands with "just-in-time" deliveries, it is important that the time required to adjust the lip gap dimensions of extrusion dies be kept as short as possible to maximize production of extruded materials and minimize production of scrap material during changeovers. Moreover, because extruded materials are often required in a wide range of thicknesses, it is desirable to provide a single die having a wide adjustment range so that a variety of material thicknesses can be produced without the need to replace the lips or other components of the die and so that minimal reconfiguration time is required.

Yet another die design is disclosed in Ryan et al. U.S. Pat. No. 5,679,383, which is owned by the assignee of the instant application. This die design includes first and second die body portions each having a main body and a lip interconnected with the main body. The die body portions are joined such that a single die outlet is formed between and bounded by the lips, and means are coupled with the die body portions for moving the lips to adjust the die outlet. The moving means includes a lip adjustment block coupled to one of the lips for adjusting the position of the one lip and further includes translating means for translating the lip adjustment block. The translating means includes a sliding angle member having a threaded stud axially extending therefrom and a spool having threads that engage corresponding threads on the stud. Rotation of the spool causes the sliding angle member to be moved in a first direction. The sliding angle member and the lip adjustment block are interconnected by angled flanges or cam surfaces disposed in angled grooves such that the lip adjustment block moves the lip in a second direction transverse to the direction when the sliding angle member is moved in the first direction.

While the die design disclosed in the Ryan et al. '383 patent has been effective to reduce reconfiguration time, it has been found that problems can be encountered over time. Specifically, the high heat levels developed in the die can cause the grease that lubricates the flanges and grooves to degrade, thereby possibly limiting the adjustability of the device.

SUMMARY OF THE INVENTION

In accordance with one aspect of the present invention, an extrusion die includes a pair of die body portions each having a lip wherein one of the lips is moveable toward and away from the other lip about a hinge portion coupled to a main body of one of the die body portions. A pivoting member is coupled to the one lip and a sliding member is engaged with the pivoting member and movable along a first path to cause the pivoting member to pivot and move the lip along a second path transverse to the first path.

Preferably, the die further includes an anchor member having a first end coupled to the sliding member and a second end coupled to the main body wherein the anchor member pivots in response to movement of the sliding member along the first path. Also preferably, the sliding member is channel-shaped with a recess therein and the first end of the anchor member and a first end of the pivoting member are disposed in the recess and coupled to the sliding member at a common point. Still further, the sliding member is coupled to an adjustment member which is movable with the sliding member. The adjustment member preferably includes threads engaged by threads of a rotatable spool and the adjustment member is disposed in an indicator housing secured to the one die body portion. Also, the spool may be restrained against axial movement by a spool retainer secured to the indicator housing and an indicator member may be secured to the adjustment member.

In addition, the spool may be retained at a first end of the die such that rotation of the spool in either of first and second rotational directions causes movement of the sliding member, thereby moving the pivoting member to adjust, in turn, the position of the one lip bidirectionally toward and away from the other lip.

In a specific embodiment, means may be provided for moving the other lip independently of the one lip. Such means may comprise a computer control. The computer control may also be operative to move the sliding member.

In accordance with another aspect of the present invention, an extrusion die comprises a pair of die body portions each having a lip wherein one of the lips is moveable toward and away from the other lip about a hinge portion coupled to a main body of one of the die body portions. A plurality of pivoting link assemblies is coupled to the one lip and a sliding member is engaged with the pivoting link assemblies and movable along a first path to cause the pivoting link assemblies to pivot and move the lip along a second path transverse to the first path.

In accordance with yet another aspect of the present invention, an extrusion die includes a pair of die body portions each having a lip and wherein one of the lips is moveable toward and away from the other lip about a hinge portion coupled to a main body of one of the die body portions. Pivoting links are coupled to the one lip and a channel-shaped sliding member is provided having a recess therein and movable along a first path. A plurality of anchor members is also provided each having a first end coupled to an end of an associated one of the pivoting links and further coupled to the sliding member within the recess, wherein each of the anchor members further has a second end coupled to the one die body portion. A movement apparatus is operable to move the sliding member along the first path and cause the pivoting links to pivot and move the lip along a second path transverse to the first path.

Other aspects and advantages of the present invention will become apparent upon consideration of the following drawings and detailed description.

DESCRIPTION OF THE PREFERRED EMBODIMENTS

Figure 1:
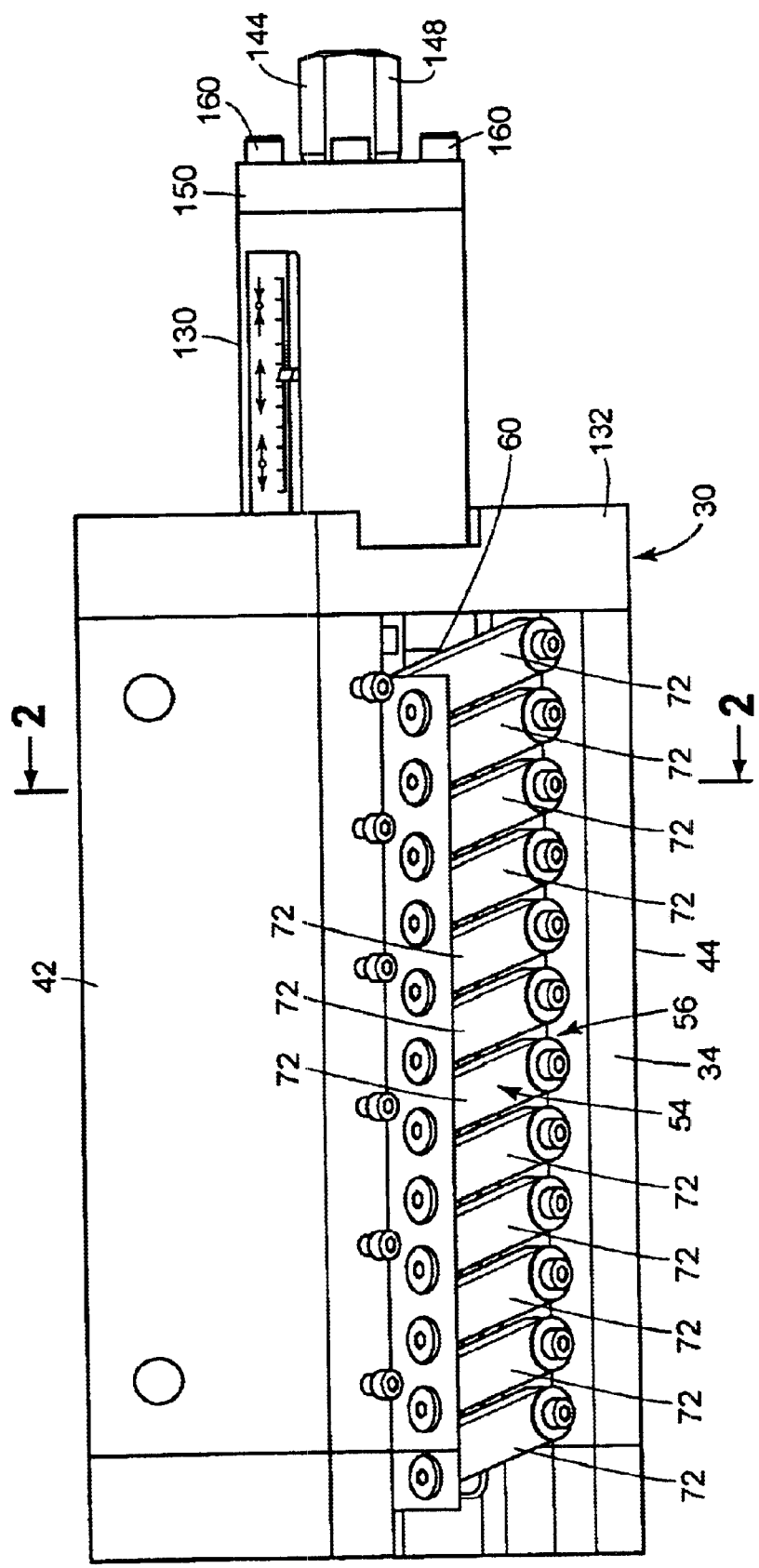
FIG. 1 comprises an elevational view of an extrusion apparatus according to the present invention with a cover plate removed therefrom.

Referring now to FIGS. 1–5, an extrusion apparatus or die 30 in accordance with the present invention includes first and second die body portions 32, 34. The die body portion 32 includes a main body 36, a lip 38, and a hinge 40 interconnecting the lip 38 with the main body 36. Similarly, the die body portion 34 includes a main body 42, a lip 44, and a hinge 46 interconnecting the lip 44 with the main body 42. The die body portions 32, 34 are joined by body bolts (not shown) such that a single die outlet 50 (FIG. 2) is formed between and bounded by the lips 38, 44. Mechanically adjustable bolts 52 are coupled between the main body 36 and the lip 38 for moving the lip 38 bidirectionally to precisely adjust the dimensions of the die outlet 50. Alternatively, the bolts 52 may be thermally expandable and a series of heaters (not shown) may be automatically controlled to adjust the dimensions of the die outlet 50 as disclosed in Nissel U.S. Pat. No. 3,940,221, the disclosure of which is hereby incorporated herein by reference.

Figure 4:
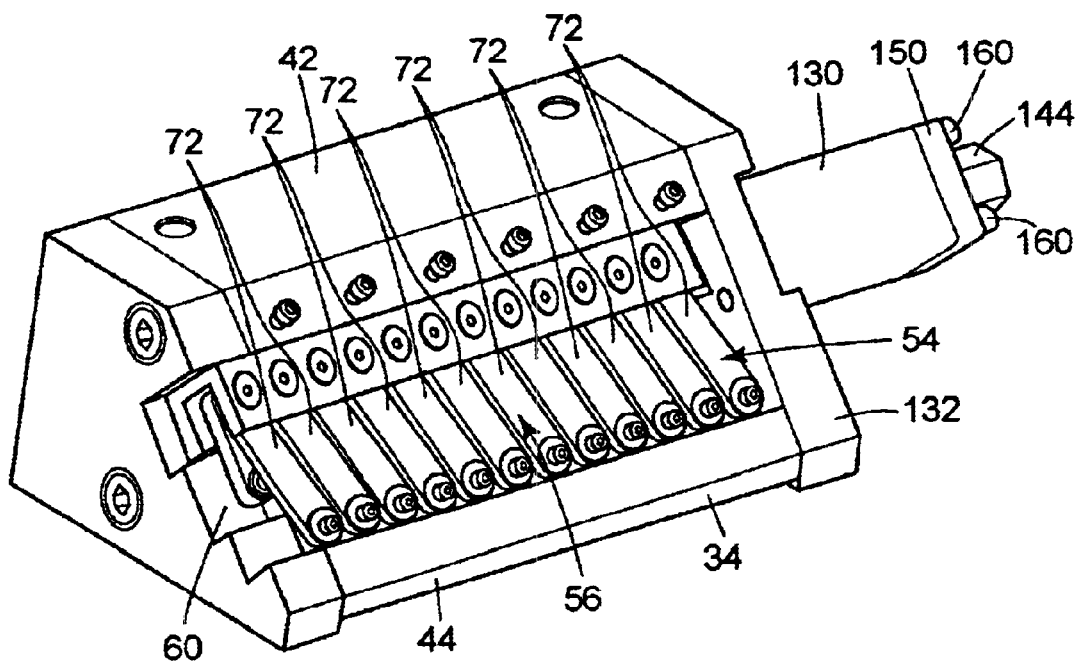
FIG. 4 comprises a fragmentary trimetric view of the portion of the extrusion apparatus of FIG. 3 taken from an opposite side thereof and with the cover plate removed therefrom.

An apparatus 54 is provided for moving the lip 44 to further adjust the die outlet 50. Specifically, a plurality of pivoting link assemblies 56 is provided within a longitudinally extending recess 60 in the die body portion 42. The recess is partially covered by a cover plate 62 which is bolted or otherwise secured to the die body portion 42 (FIGS. 1 and 4 illustrate the apparatus 54 with the cover plate 62 removed to reveal the components thereof).

Figure 2:
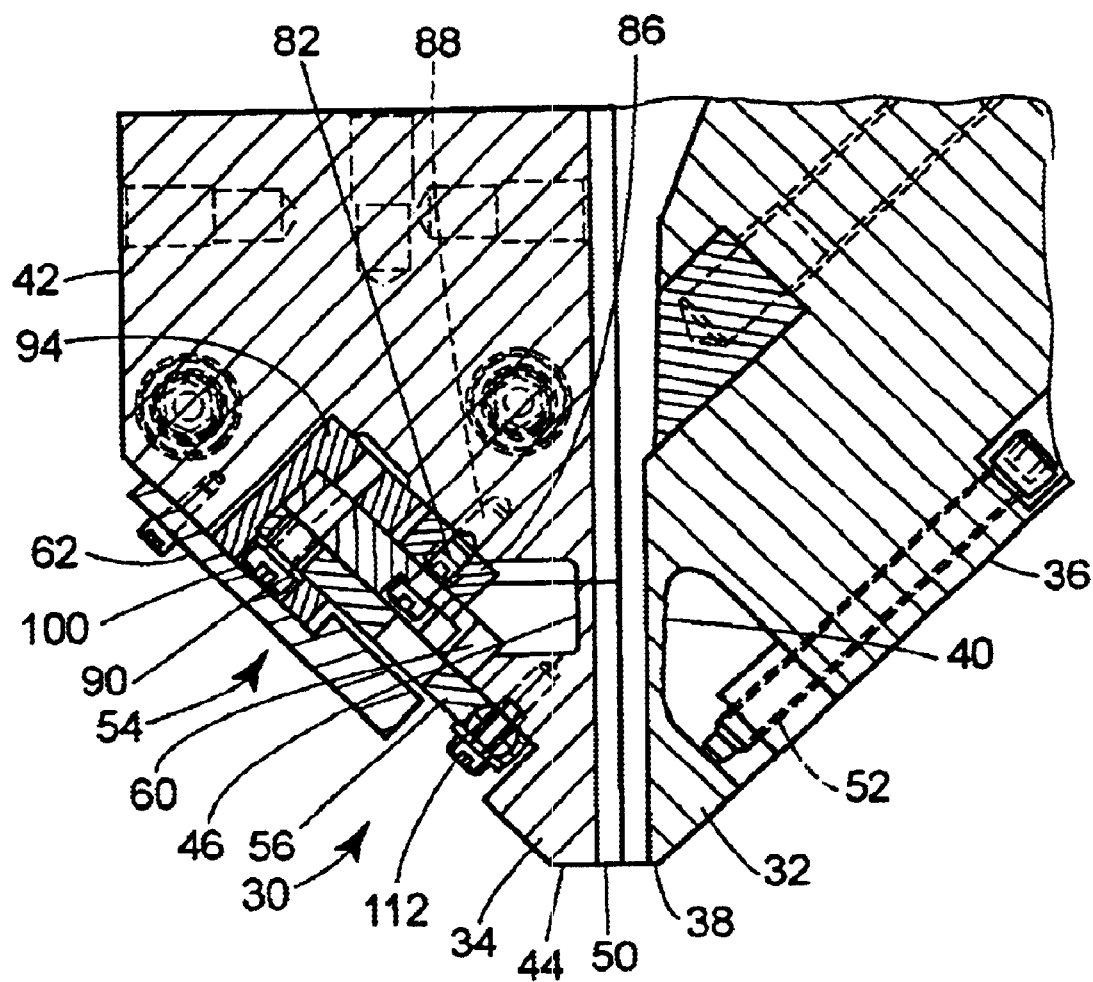
FIG. 2 comprises a sectional view of the extrusion apparatus of the present invention taken generally along the lines 2—2 of FIG. 1.
Figure 3:
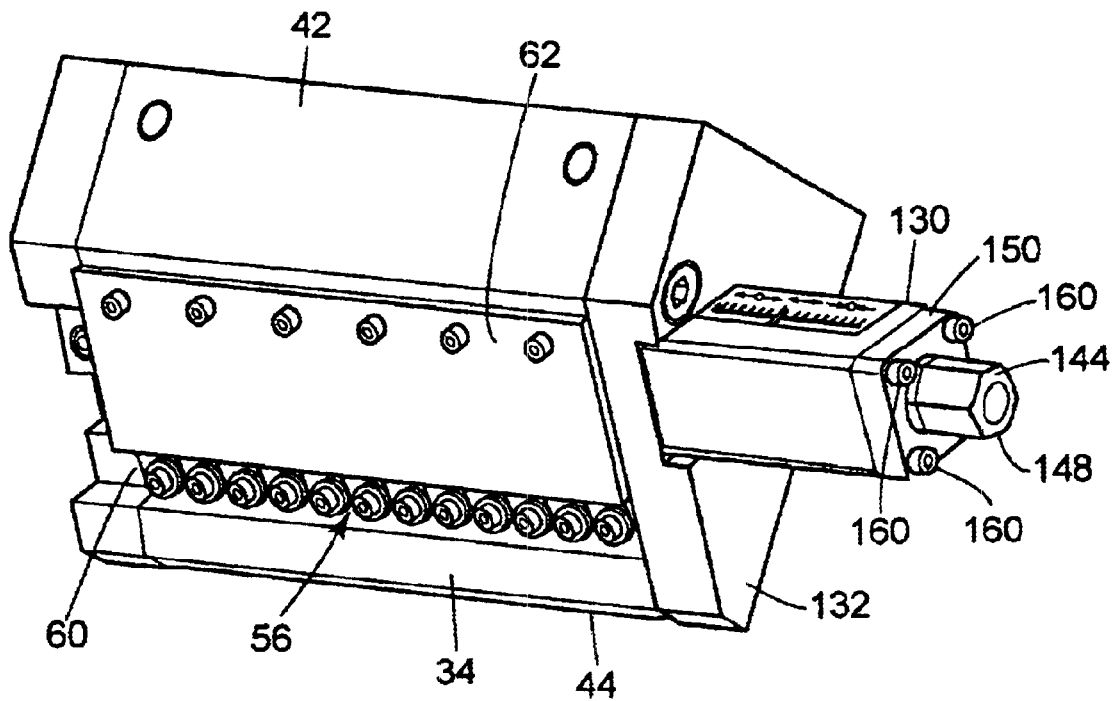
FIG. 3 comprises a fragmentary trimetric view of a portion of the extrusion apparatus of FIG. 1 taken from a first side thereof.
Figure 5:
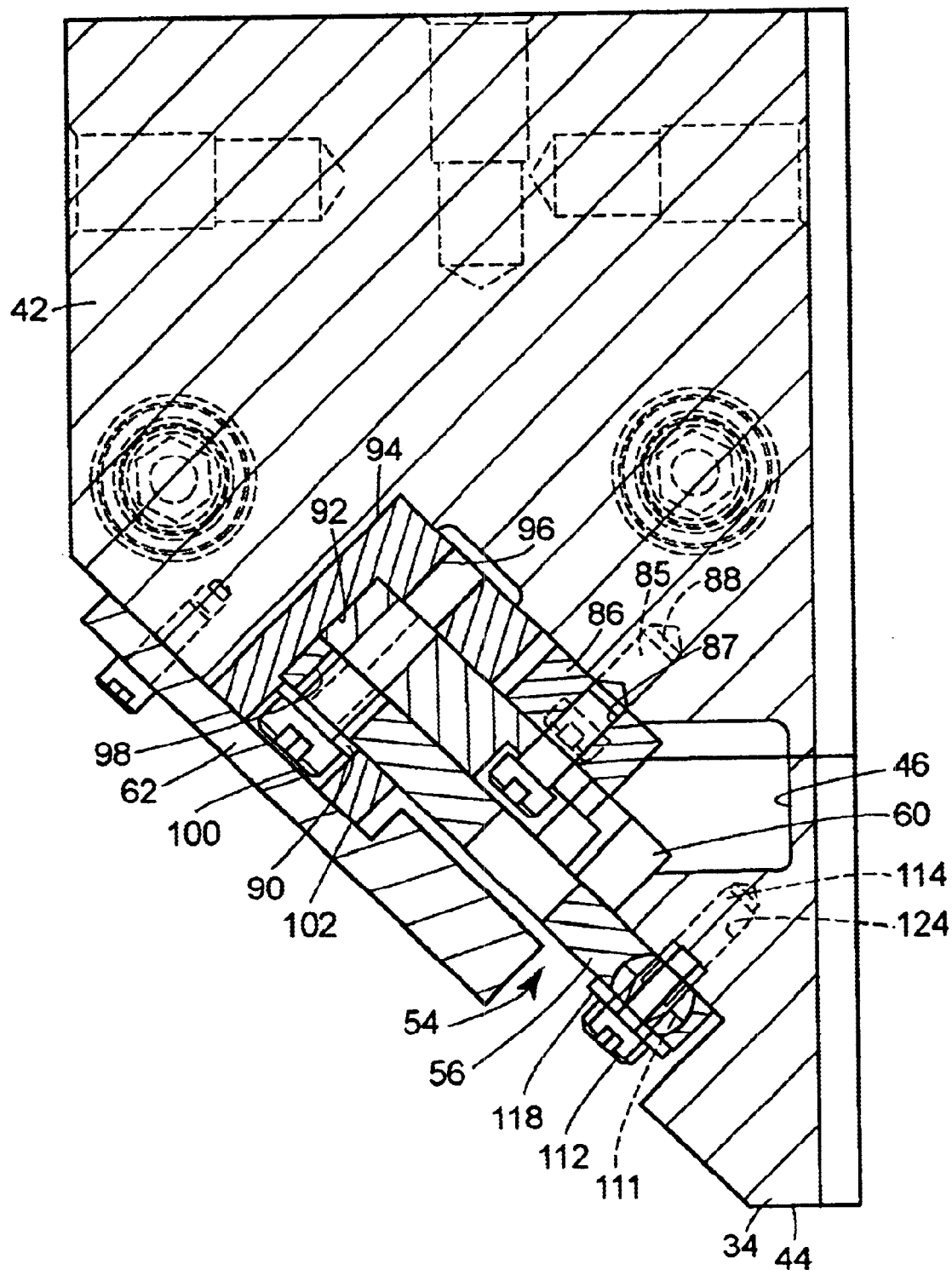
FIG. 5 comprises a fragmentary enlarged view of the section of FIG. 2.
Figure 6:
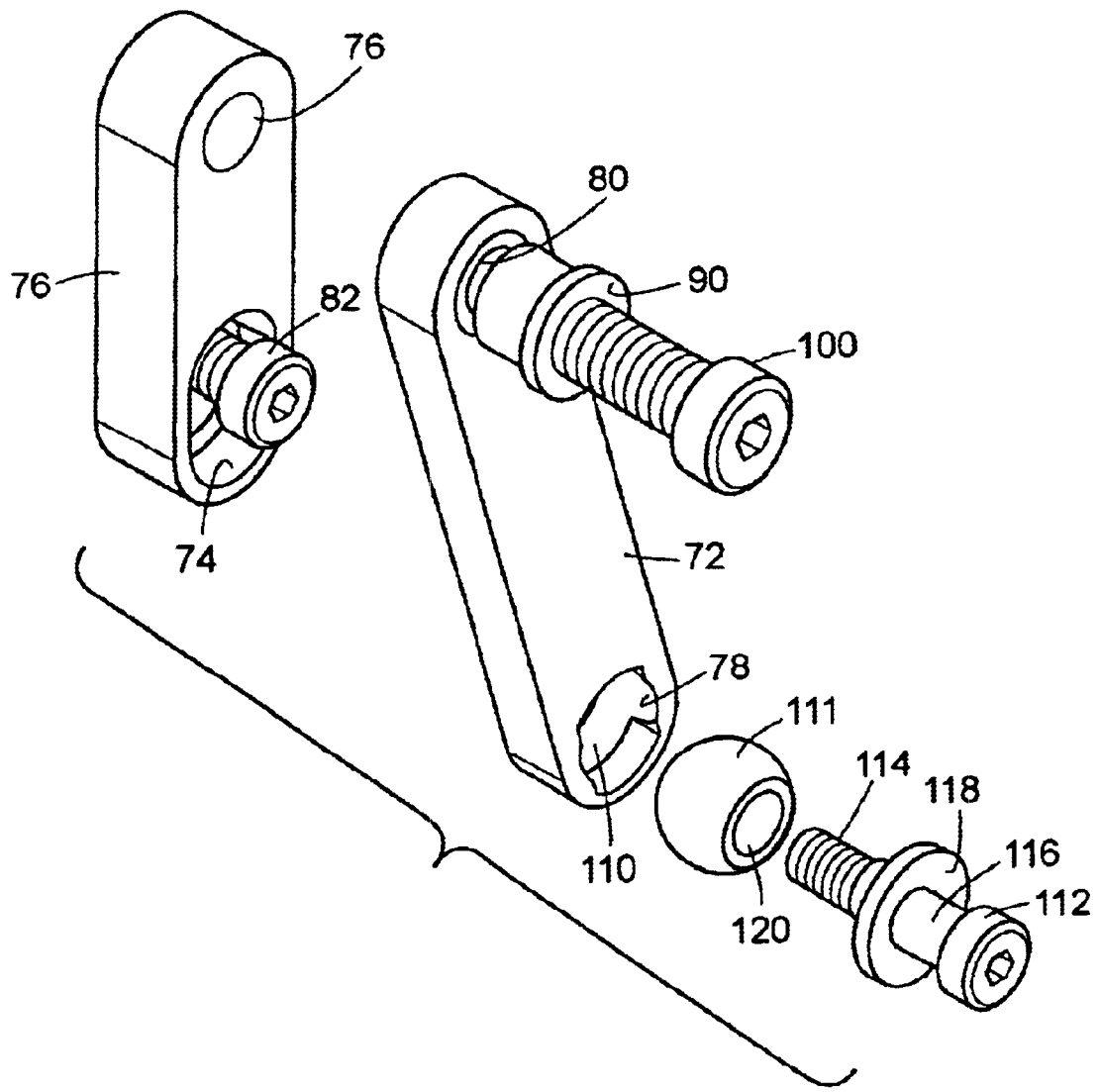
FIG. 6 comprises a fragmentary exploded isometric view of one of the link assemblies of FIG. 1.
Figure 7:
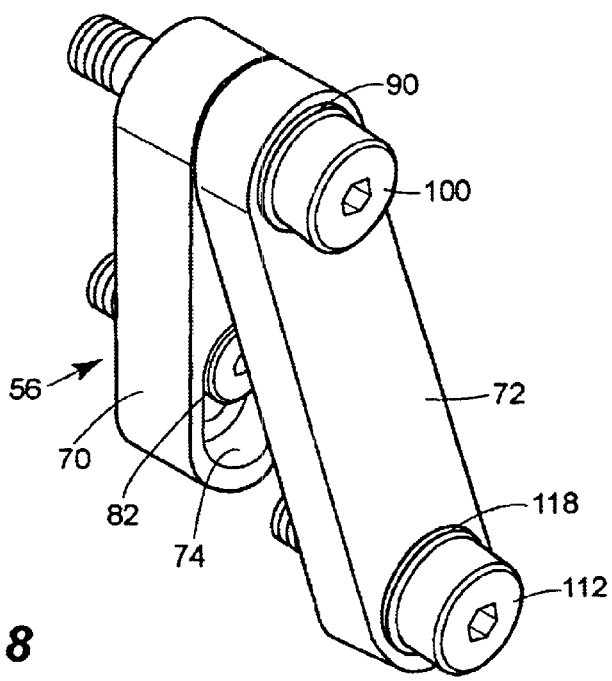
FIG. 7 comprises a fragmentary isometric view the assembled link assembly of FIG. 6.
Figure 14:
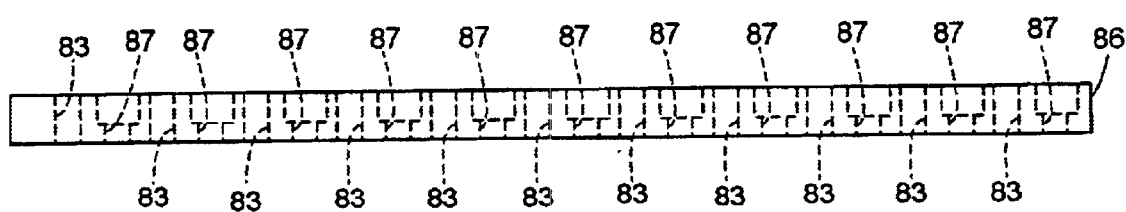
FIGS. 14 and 15 are plan and side elevational views, respectively, of the mounting bar of FIG. 5.
Figure 15:
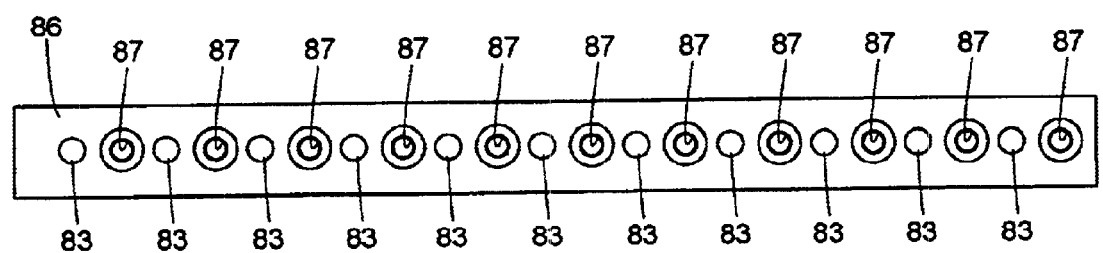

As seen in FIGS. 6–9,each of the link assemblies 56 includes an anchor link or member 70 and a pivoting link member 72. Each anchor link 70 includes a first elongated bore 74 at one end thereof and a second bore 76 at a further end thereof. In like fashion, the pivoting link member 72 includes first and second bores 78,80, respectively, at opposite ends thereof. As seen in FIGS. 2 and 5, a first fastener in the form of a threaded shoulder screw 82 extends through the elongated bore 74 into an associated and aligned threaded bore 83 in a mounting bar 86 (shown in greater detail in FIGS. 14 and 15). Further fasteners 85 extend through bores 87 in the mounting bar 86 into threaded bores 88 in the die body portion 42 to secure the mounting bar 86 to the portion 42. Preferably, each fastener 82 restrains the associated anchor link 70 against longitudinal or lateral movement while permitting pivoting movement about the fastener 82 and translation of the anchor link 70 by a distance determined by the length of the elongated bore 74.

A sleeve bushing 90 is disposed in each bore 80 of each pivoting link member 72. Referring to FIGS. 2, 5 and 10–13, the links 70, 72 are disposed in a channel or recess 92 of a slide bar or member 94 such that the bores 80 and 76 of the links 72, 70, respectively, are aligned with associated threaded bores 96 and opposed enlarged bores 98 of the slide bar 94. Referring also to FIGS. 6–9, a fastener in the form of a threaded shoulder screw 100 extends through each sleeve bushing 90 and the bores 80 and 76 and is threaded into one of the threaded bores 96 of the slide bar 94. The enlarged bores 98 in the slide bar accommodate the heads of the fasteners 100 and permit access for a tool to engage the fasteners 100 through a wall 102 of the slide bar 94. The fasteners 100 connect each pivoting link member 72 to each anchor link 70 at a common point of the slide bar 94 such that each pivoting link member can pivot relative to the associated anchor link 70.

Referring specifically to FIGS. 5, 6, 9, 23 and 24, a spherical seat 110 is disposed in the bore 78 in the pivoting link member 72. A spherical ball bushing 111 is disposed in the bore 78 and includes a curved outer surface in contact with walls defining the spherical seat 110. A fastener in the form of a shoulder screw 112 includes a threaded portion 114 and an unthreaded portion 116. The fastener 112 extends through a washer 118 and a bore 120 (FIG. 6) in the ball bushing 111 and the threaded portion 114 is threaded into a threaded bore 124 (FIG. 5) in the die lip 44.

Figure 16:
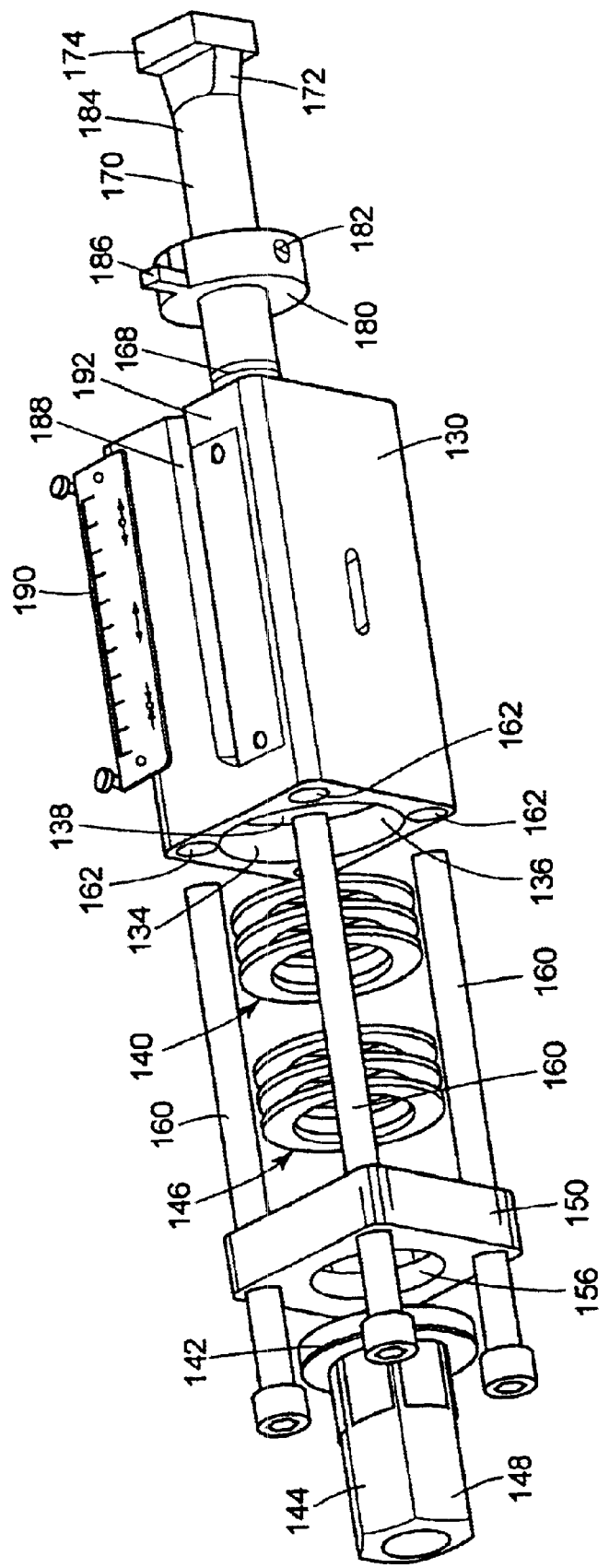
FIG. 16 comprises a fragmentary exploded trimetric view of the movement apparatus of FIG. 1.
Figure 19:
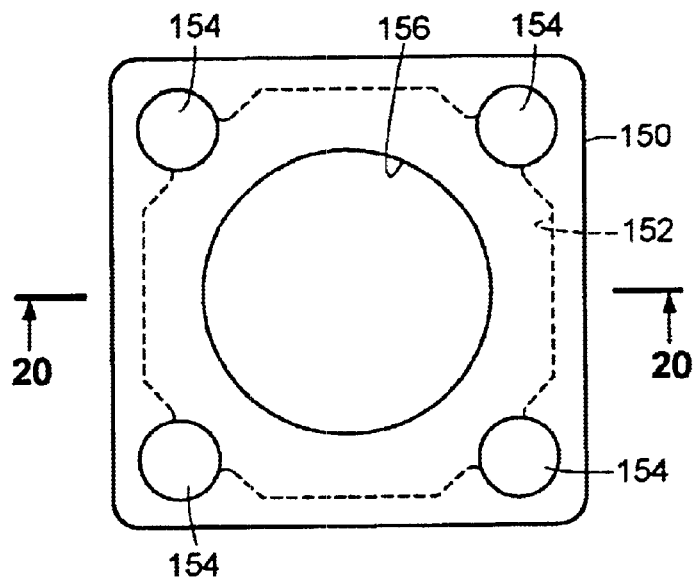
FIG. 19 comprises a front elevational view of the spool retainer of FIG. 16.
Figure 20:
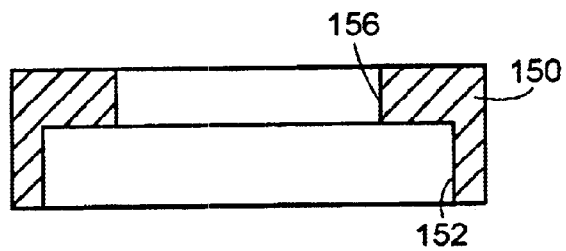
FIG. 20 is a sectional view taken generally along the lines 20—20 of FIG. 19.

Referring now to FIGS. 1, 3, 4 and 16, an indicator housing 130 is secured to a side plate 132, which is in turn secured to the die body portion 42 of the die 30. As seen in FIG. 16, the indicator housing 130 includes a counterbore 134 defined by a side wall 136 and a base wall 138. A first needle bearing assembly 140 is disposed in the counterbore 134 adjacent the base wall 138. A circumferential flange 142 of a spool 144 is disposed in the counterbore 134 adjacent the first bearing assembly 140 and a second needle bearing assembly 146 is disposed adjacent the circumferential flange 142 on a side opposite the first bearing assembly 140. The second bearing assembly includes a central aperture to permit the second bearing assembly to pass over an elongate actuation portion 148 of the spool 144. Referring to FIGS. 16, 19 and 20, a spool retainer 150 includes an inner recess 152, a plurality of peripheral bores 154 and an enlarged central bore 156. The spool retainer 150 is disposed adjacent the indicator housing 130 such that the first and second bearing assemblies 140, 146 and the flange 142 of the spool 144 are captured (and therefore restrained against axial movement) in the space defined by the base wall 138, the side wall 136 and the inner recess 152 and so that the elongate actuation portion 148 extends through the enlarged central bore 156. A plurality of elongate bolts 160 extends through the bores 154 and aligned bores 162 (three of which are visible in FIG. 16) in the indicator housing 130 and are threaded into bores in the side plate 132 to maintain the various parts in assembled relation. The first and second bearing assemblies 140, 146 permit rotation of the spool 144 when assembled with the retainer 150 and the indicator housing 130.

Figure 17:
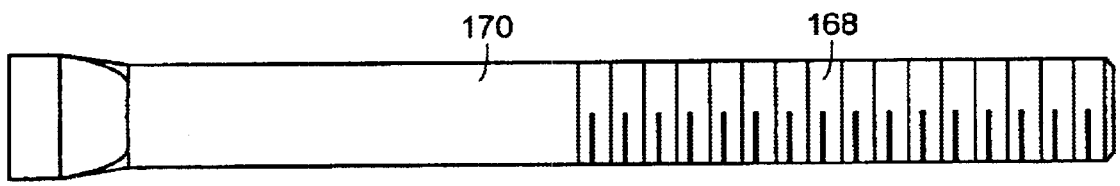
FIG. 17 comprises a side elevational view of the lip adjustment stud of FIG. 16.
Figure 18:
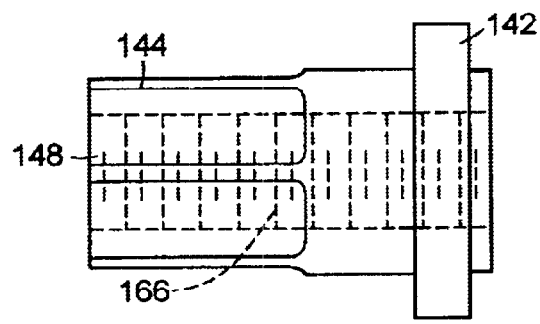
FIG. 18 comprises a side elevational view of the adjustment spool of FIG. 16.
Figure 21:
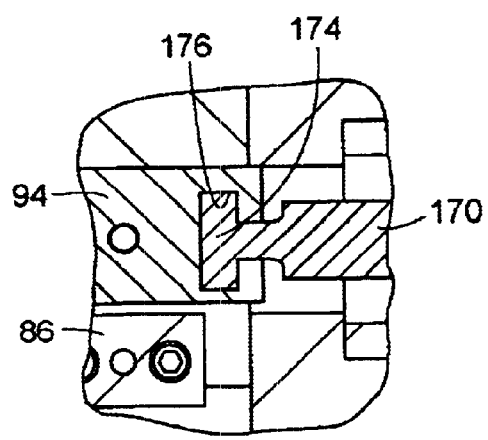
FIG. 21 is a fragmentary, enlarged sectional view illustrating the interconnection of the slide bar with the lip adjustment stud.

As seen in FIG. 18, the spool 144 includes internal threads 166 which engage threads 168 of an adjustment stud 170 (FIGS. 16 and 17). The adjustment stud 170 further includes an enlarged head 172 having an end flange 174. As seen in FIG. 21, the end flange is captured within a slotted recess 176 located at one end of the slide bar 94. As should be evident from an inspection of FIG. 21, the adjustment stud 170 and the slide bar 94 are thereby secured together for bidirectional movement as a unit.

Referring again to FIG. 16, a ring-shaped collar 180 is secured by a set screw 182 to an unthreaded portion 184 of the adjustment stud 170. The collar 180 includes an upstanding portion 186 which is disposed in a slot 188 adjacent an indicator scale 190 secured to a face 192 of the indicator housing 130.

During operation, rotation of the spool 144 results in bidirectional lateral translation (as seen in FIG. 21) of the adjustment stud 170 and the sliding member 94 owing to the engagement of the threaded portion 168 with the internal threads of the spool 144. This lateral translation causes the anchor links 70 to pivot about the bolts 82, in turn resulting in a combined pivoting and bidirectional up-and-down translation (as seen in FIG. 1) of the pivoting link members 72. Because the lower ends of the pivoting link members 72 are secured firmly to the die lip 34, the bidirectional up-and-down translation of the link members 72 also results in a bidirectional in-and-out translation (again, as seen in FIG. 1) of the lower ends of the link members and, hence, movement of the die lip 44 toward and away from the lip 38. Simultaneously, lip heaters (not shown) in thermal contact with the bolts 52 may be controlled so that the dimensions of the die outlet 50 can be precisely adjusted.

Figure 8:
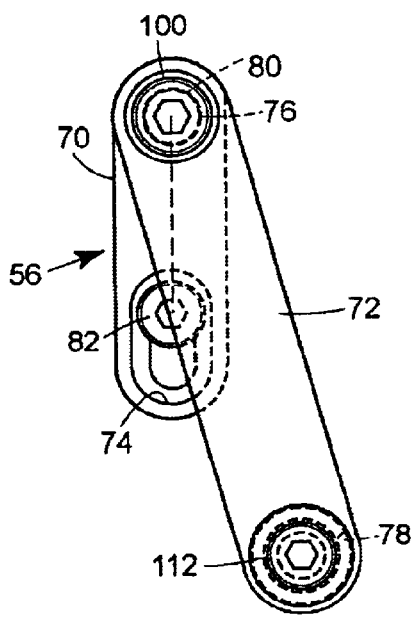
FIGS. 8 and 9 are front and side elevational views, respectively, of the link assembly of FIG. 7 as disposed in a neutral position.
Figure 9:
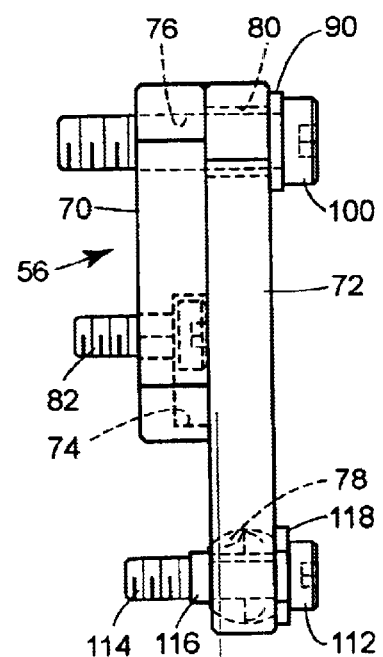
Figure 10:
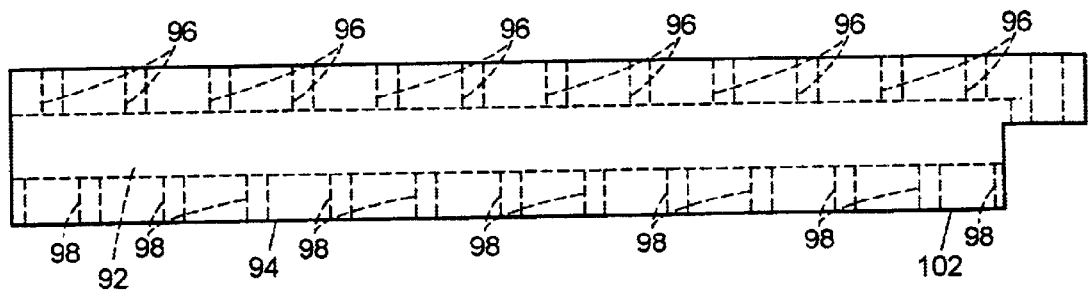
FIGS. 10, 11, 12 and 13 are plan, side elevational, end elevational and trimetric views, respectively, of the slide bar of FIG. 5.
Figure 11:
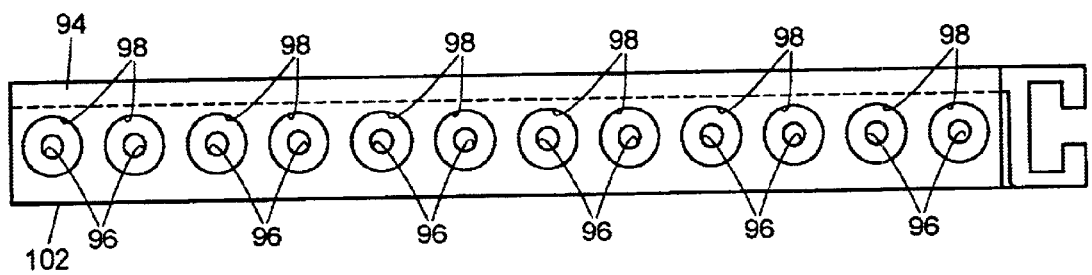
Figure 12:
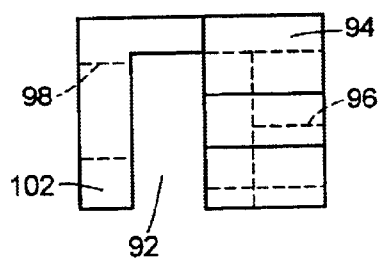
Figure 13:
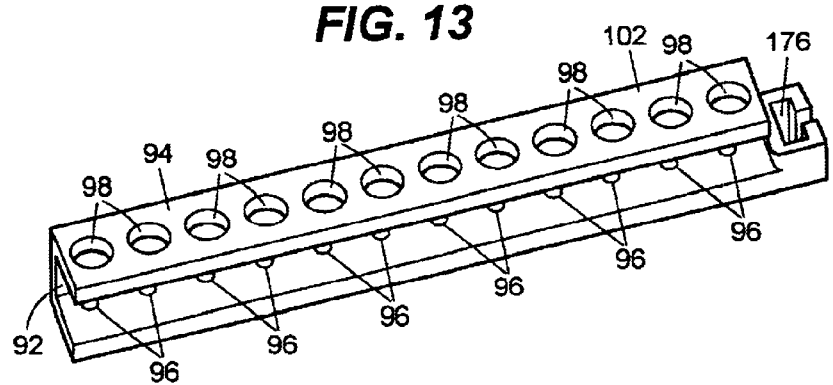

More specifically, FIG. 8 illustrates the positions of the links 70 and link members 72 when the die lip 44 is in the free state (i.e., when the links 70 and link members 72 exert substantially no forces on the die lip 44). In this case, the fastener 100 is located to the left (as seen in FIG. 8) of the fastener 112 by a substantial distance and further is located approximately directly above the fastener 82. Also, the bolt 82 is located at the top of the elongated bore 74.

Figure 25:
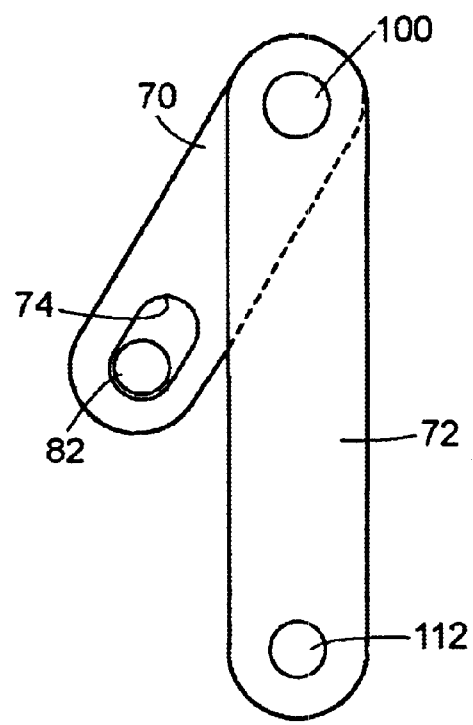
FIGS. 25 and 26 are diagrammatic views similar to FIG. 8 illustrating the links and link members in fully closed and fully open positions, respectively.

FIG. 25 diagrammatically illustrates a link assembly in the fully closed position. In this case, each link member 72 is disposed in a substantially vertical orientation (as seen in FIG. 25) such that the fastener 100 is disposed approximately directly above the fastener 112 and such that the fastener 100 is disposed to the right of the fastener 82 by a substantial distance. Further, the fastener 82 traverses the length of the elongated bore 74 during movement from the neutral position shown in FIG. 8 to the fully closed position of FIG. 25 such the fastener 82 is located at the bottom of the elongated bore 74. In this condition, each link member 72 is in compression, forcing the die lip 44 to the fully closed position.

Figure 26:
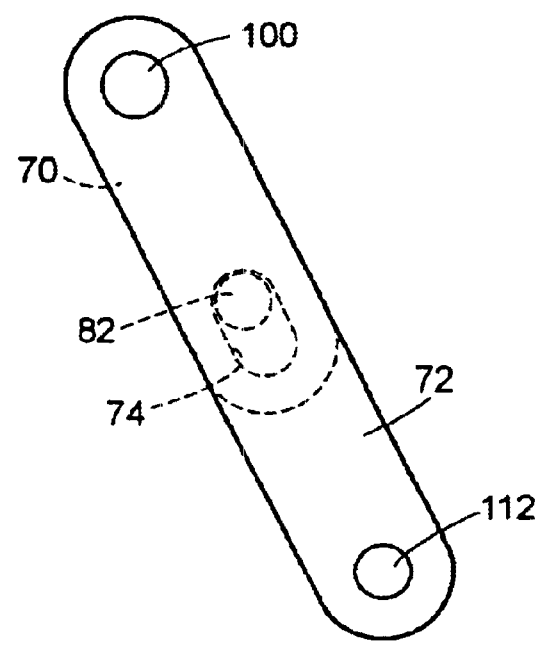

FIG. 26 diagrammatically illustrates a link assembly in the fully open position. In this case, each link member 72 is aligned with the associated link 70 and the fasteners 82, 100 and 112 are disposed on a diagonal line. Each link 70 is in compression whereas each link member 72 is in tension, thereby pulling the die lip 44 to the fully opened position. During movement of the link assemblies toward the fully open position each link 70 swings the associated link member 72 toward the left (as seen in FIGS. 8, 25 and 26). Clearance is provided between the slide bar 94 and the walls defining the space within which the slide bar 94 is disposed to permit such movement. In addition, as the link assembly moves from the fully closed position toward the fully open position, the fastener 82 moves to the upper end of the elongated bore 74 to prevent binding of the link assembly.

When the link assemblies are moving from the neutral position (FIG. 8) to the fully closed position (FIG. 25), the link member 72 acts as a toggle or lever to move the die lip. In fact, the force exerted by the member 72 on the die lip 44 increases as the link member 72 moves toward the vertical position, thereby offsetting the increasing counter-force exerted by the lip with increasing deflection thereof. During this movement, the link 70 does not exert any substantial force on the die lip 44. On the other hand, as the link assemblies are moving from the neutral position to the fully open position of FIG. 26, the mechanical advantage afforded by the link member 72 reduces. The link 70 acts as another toggle during this movement to assist in opening the die lip 44.

The upstanding portion 186 together with the indicator scale 190 indicates the position of the adjustment stud 170 and the sliding member 94. Because the position of these members is related to the position of the die lip 44, the indicator scale can be provided with markings to indicate the position of the lip 44.

As should be evident from the foregoing, by making a simple, single-point adjustment (i.e., turning the spool 144 using a wrench or other tool), the entire lip 44 may be moved to adjust the gap of the lip 50. Further, by initially setting the position of the lip 44 at a mid-range position, a total travel range for the lip 44 of 0.200 inches (i.e., .+−.0.100 inches from the mid-range position) can be achieved. Thus, the die outlet 50 can be preset to a wide range of gap widths in a relatively short period of time as compared with the prior art die designs described above.

Figure 22:
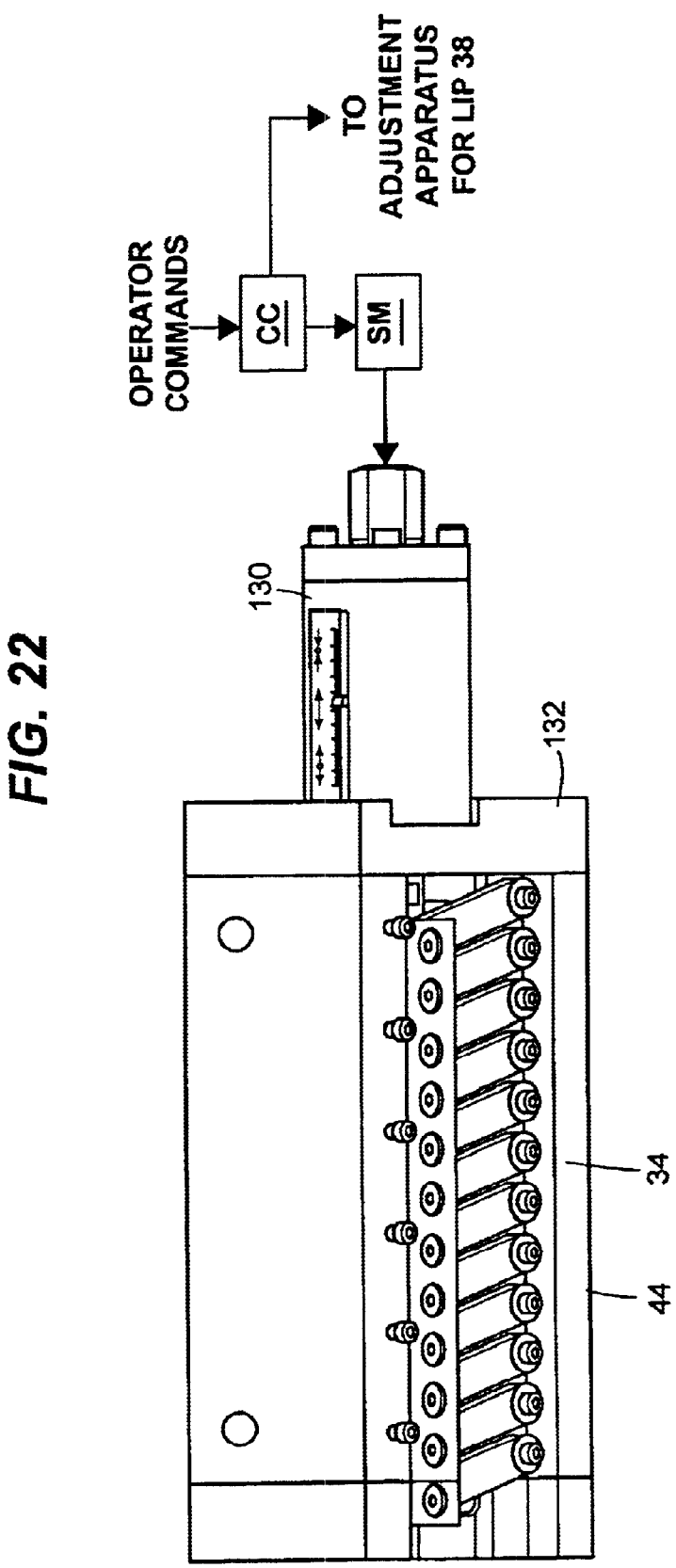
FIG. 22 comprises a combined block diagram and elevational view similar to FIG. 2 illustrating an alternative embodiment of the present invention.
Figure 23:
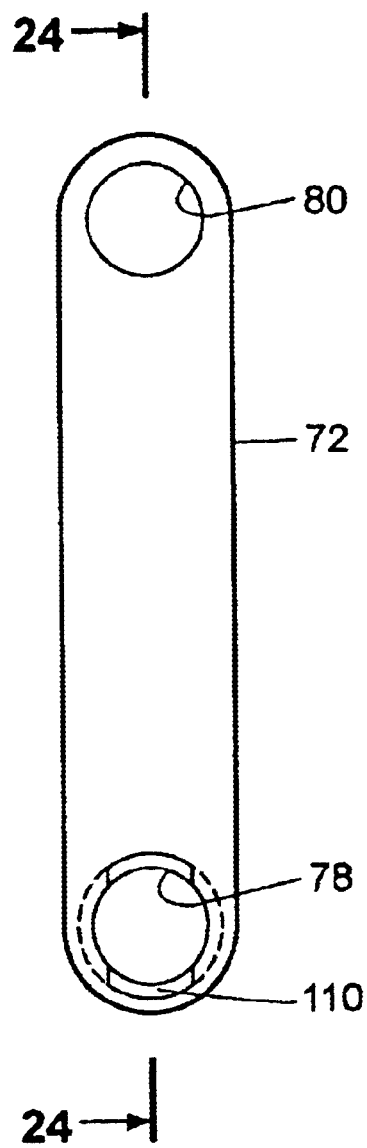
FIG. 23 comprises a front elevational view of the pivoting link member of FIGS. 6–9.
Figure 24:
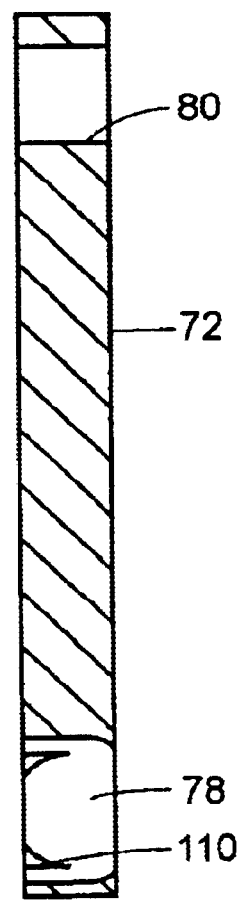
FIG. 24 is a sectional view taken generally along the lines 24—24 of FIG. 23.

It should also be noted that instead of providing the disclosed manual or automatic adjustment of the lip 38, an alternative adjustment apparatus or any other moving means may be provided, as desired. In fact, the adjustment apparatus could be identical to that used to move the lip 44 as described herein. In such a case, as seen in FIG. 22, one or more servomotors SM may be employed in conjunction with a computer control CC to automatically and independently adjust the positions of one or both lips 38, 44 in response to commands issued by an operator, if desired.

In addition, it should be noted that the lips 38, 44 may be separate from the main body portions and may be secured to the main body portions by means other than integral hinges.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

I claim:

1. An extrusion die, comprising:
    a pair of die body portions each having a lip and wherein one of the lips is moveable toward and away from the other lip about a hinge portion coupled to a main body of one of the die body portions; and
    a pivoting member coupled to the one lip and a sliding member engaged with the pivoting member and movable along a first path to cause the pivoting member to pivot and move the lip along a second path transverse to the first path.

2. The extrusion die of claim 1, further including an anchor member having a first end coupled to the sliding member and a second end coupled to the main body wherein the anchor member pivots in response to movement of the sliding member along the first path.

3. The extrusion die of claim 2, wherein the sliding member is channel-shaped with a recess therein and wherein the first end of the anchor member and a first end of the pivoting member are disposed in the recess and coupled to the sliding member at a common point.

4. The extrusion die of claim 1, wherein the sliding member is coupled to an adjustment member which is movable with the sliding member.

5. The extrusion die of claim 4, wherein the adjustment member includes threads engaged by threads of a rotatable spool.

6. The extrusion die of claim 5, wherein the adjustment member is disposed in an indicator housing secured to the one die body portion.

7. The extrusion die of claim 6, wherein the spool is restrained against axial movement by a spool retainer secured to the indicator housing.

8. The extrusion die of claim 6, wherein an indicator member is secured to the adjustment member.

9. The extrusion die of claim 5, wherein the spool is retained at a first end of the die such that rotation of the spool in either of first and second rotational directions causes movement of the sliding member, thereby moving the pivoting member to adjust, in turn, the position of the one lip bidirectionally toward and away from the other lip.

10. The extrusion die of claim 1, including means for moving the other lip independently of the one lip.

11. The extrusion die of claim 1, wherein the sliding member is moved by a computer control.

12. The extrusion die of claim 11, wherein the computer control is also operative to move the other lip independently of the one lip.

13. An extrusion die, comprising:
    a pair of die body portions each having a lip and wherein one of the lips is moveable toward and away from the other lip about a hinge portion coupled to a main body of one of the die body portions; and
    a plurality of pivoting link assemblies coupled to the one lip and a sliding member engaged with the pivoting link assemblies and movable along a first path to cause the pivoting link assemblies to pivot and move the lip along a second path transverse to the first path.

14. The extrusion die of claim 13, wherein each pivoting link assembly includes a pivoting link coupled to the sliding member and an anchor member wherein each anchor member has a first end coupled to the sliding member and a second end coupled to the main body wherein each anchor member pivots in response to movement of the sliding member along the first path.

15. The extrusion die of claim 14, wherein the sliding member is channel-shaped with a recess therein and wherein the first end of each anchor member and a first end of an associated pivoting link are disposed in the recess and are coupled to the sliding member at a common point.

16. The extrusion die of claim 13, wherein the sliding member is coupled to an adjustment member which is movable with the sliding member.

17. The extrusion die of claim 16, wherein the adjustment member includes threads engaged by threads of a rotatable spool.

18. The extrusion die of claim 17, wherein the adjustment member is disposed in an indicator housing secured to the one die body portion.

19. The extrusion die of claim 18, wherein the spool is restrained against axial movement by a spool retainer secured to the indicator housing.

20. The extrusion die of claim 18, wherein a visually-observable indicator member is secured to the adjustment member.

21. The extrusion die of claim 17, wherein the spool is retained at a first end of the die such that rotation of the spool in either of first and second rotational directions causes movement of the sliding member, thereby moving the pivoting link assemblies to adjust, in turn, the position of the one lip bidirectionally toward and away from the other lip.

22. The extrusion die of claim 13, including means for moving the other lip independently of the one lip.

23. The extrusion die of claim 13, wherein the sliding member is moved by a computer control.

24. The extrusion die of claim 23, wherein the computer control is also operative to move the other lip independently of the one lip.

25. An extrusion die, comprising:
   a pair of die body portions each having a lip and wherein one of the lips is moveable toward and away from the other lip about a hinge portion coupled to a main body of one of the die body portions;
   a plurality of pivoting links each coupled to the one lip;
   a channel-shaped sliding member having a recess therein and movable along a first path;
   a plurality of anchor members each having a first end coupled to an end of an associated one of the pivoting links and further coupled to the sliding member within the recess, each of the anchor members further it having a second end coupled to the one die body portion; and
   a movement apparatus operable to move the sliding member along the first path and cause the pivoting links to pivot and move the lip along a second path transverse to the first path.

26. The extrusion die of claim 25, wherein the movement apparatus includes an adjustment member which is movable with the sliding member.

27. The extrusion die of claim 26, wherein the movement apparatus further includes a threaded rotatable spool that engages threads of the adjustment member.

28. The extrusion die of claim 27, wherein the adjustment member is disposed in an indicator housing secured to the one die body portion.

29. The extrusion die of claim 28, wherein the spool is restrained against axial movement by a spool retainer secured to the indicator housing.

30. The extrusion die of claim 29, wherein a visually-observable indicator member is secured to the adjustment member.

31. The extrusion die of claim 27, wherein the spool is retained at a first end of the die such that rotation of the spool in either of first and second rotational directions causes movement of the sliding member, thereby moving the pivoting links to adjust, in turn, the position of the one lip bidirectionally toward and away from the other lip.

32. The extrusion die of claim 25, including means for moving the other lip independently of the one lip.

33. The extrusion die of claim 25, wherein the sliding member is moved by a computer control.

34. The extrusion die of claim 33, wherein the computer control is also operative to move the other lip independently of the one lip.

* * * * *